H. G. KLETT.
MACHINE FOR FEEDING AND CAPPING BOTTLES.
APPLICATION FILED JULY 29, 1912.

1,086,827.

Patented Feb. 10, 1914.

4 SHEETS—SHEET 4.

WITNESSES

INVENTOR
HENRY GODFRIED KLETT

BY

ATTORNEYS

UNITED STATES PATENT OFFICE.

HENRY GODFRIED KLETT, OF NEW YORK, N. Y.

MACHINE FOR FEEDING AND CAPPING BOTTLES.

1,086,827.  Specification of Letters Patent.  Patented Feb. 10, 1914.

Application filed July 29, 1912. Serial No. 712,017.

*To all whom it may concern:*

Be it known that I, HENRY GODFRIED KLETT, a subject of the German Emperor, and resident of the borough of Manhattan, city, county, and State of New York, have invented certain new and useful Improvements in Machines for Feeding and Capping Bottles, of which the following is a specification.

My invention relates to a machine for feeding and capping bottles of the same general type and construction as shown in my U. S. Patent No. 1,033,597 of July 23, 1912, and has for its principal objects; first, to provide a simplified mechanism for feeding the bottles to and removing them from the capping mechanism; second, to provide automatic mechanism whereby, should a bottle of abnormally large diameter, be brought to the capping position, or should a bottle be broken when it is at or near this position, the machine will be stopped; third, to provide means whereby the feeding mechanism of the machine may be quickly and easily adjusted for bottles of different diameters; fourth, to provide a simplified form of mechanism for the machine as a whole as compared with the machine of my prior patent above referred to whereby the machine can be constructed for less cost, operated with less power and greater certainty, and so as to require less repair.

The machine illustrated and described in my prior patent above referred to, in which type of machine my present invention as here shown is embodied, is one in which bottles are alternately fed to two similar capping mechanisms each of which operates at a speed as great as can be utilized were the bottles fed in one series to but one capping mechanism, thus providing a duplex feeding and capping machine.

Figure 1:
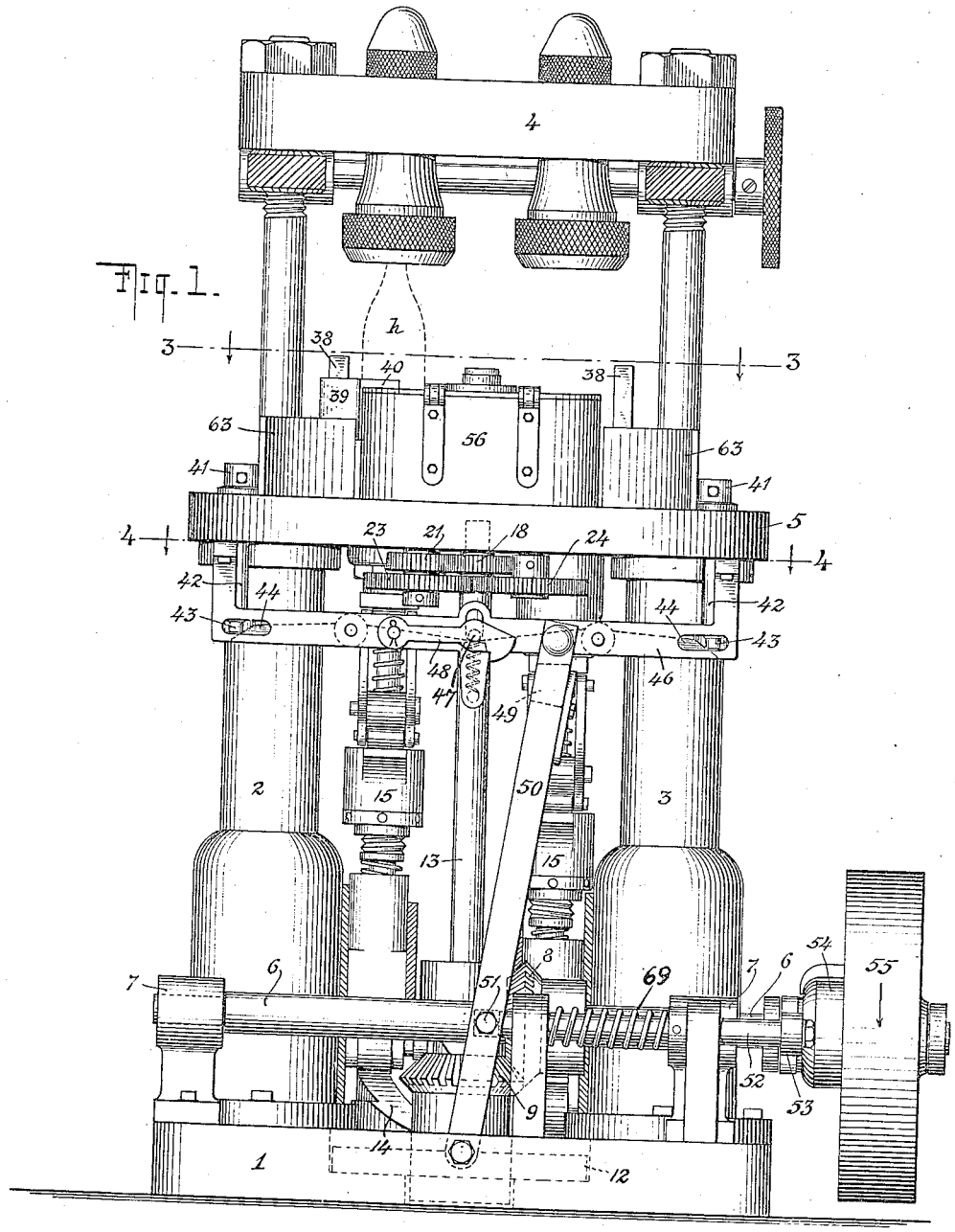
Figure 2:
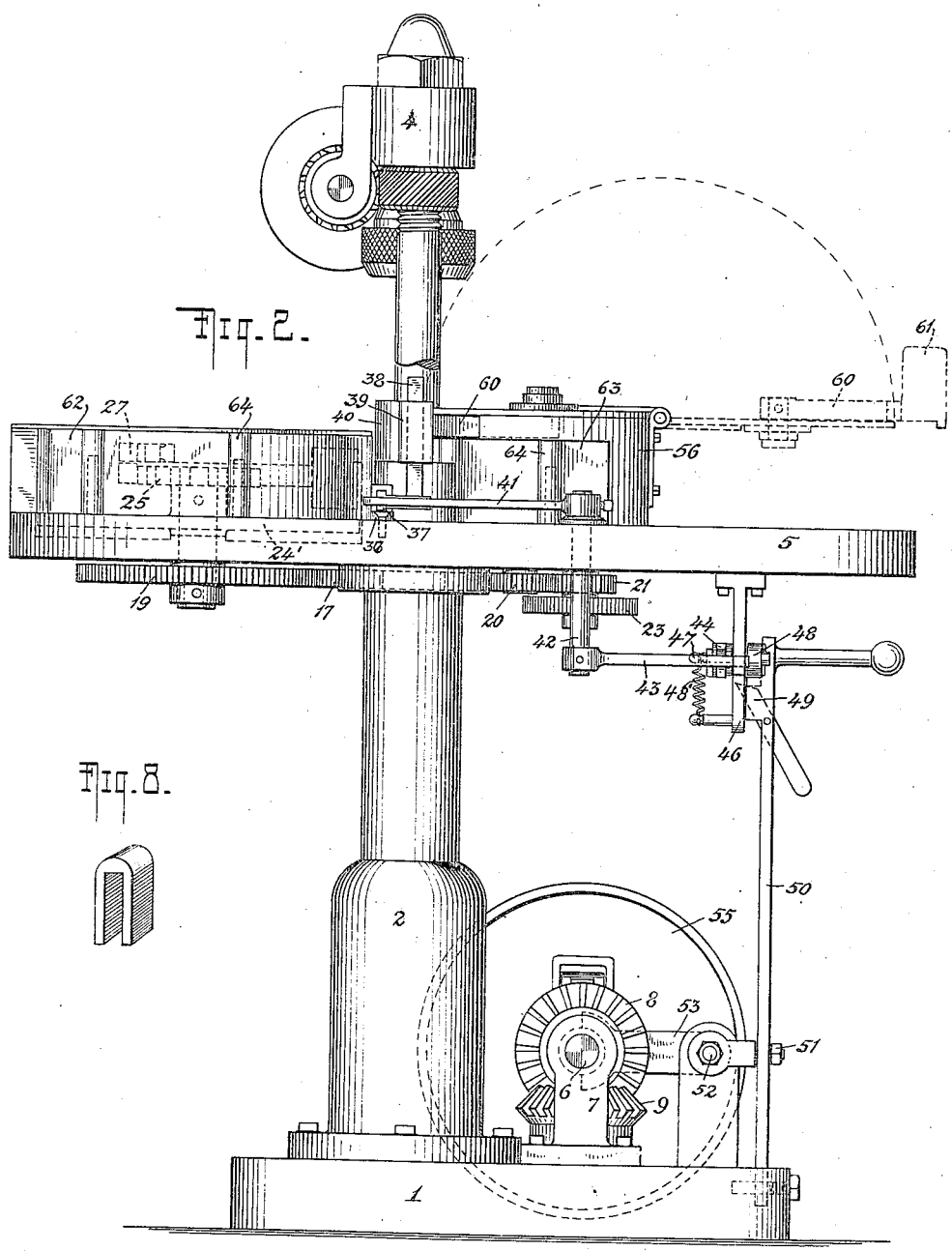
Figure 3:
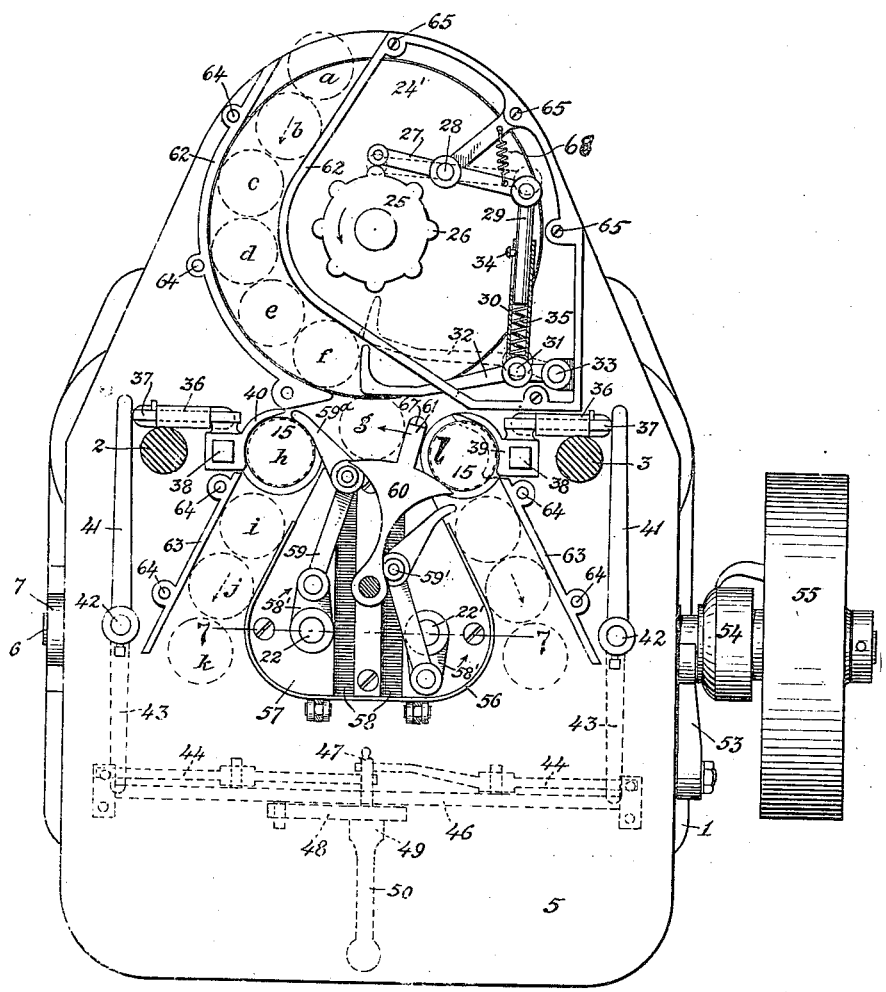
Figure 4:
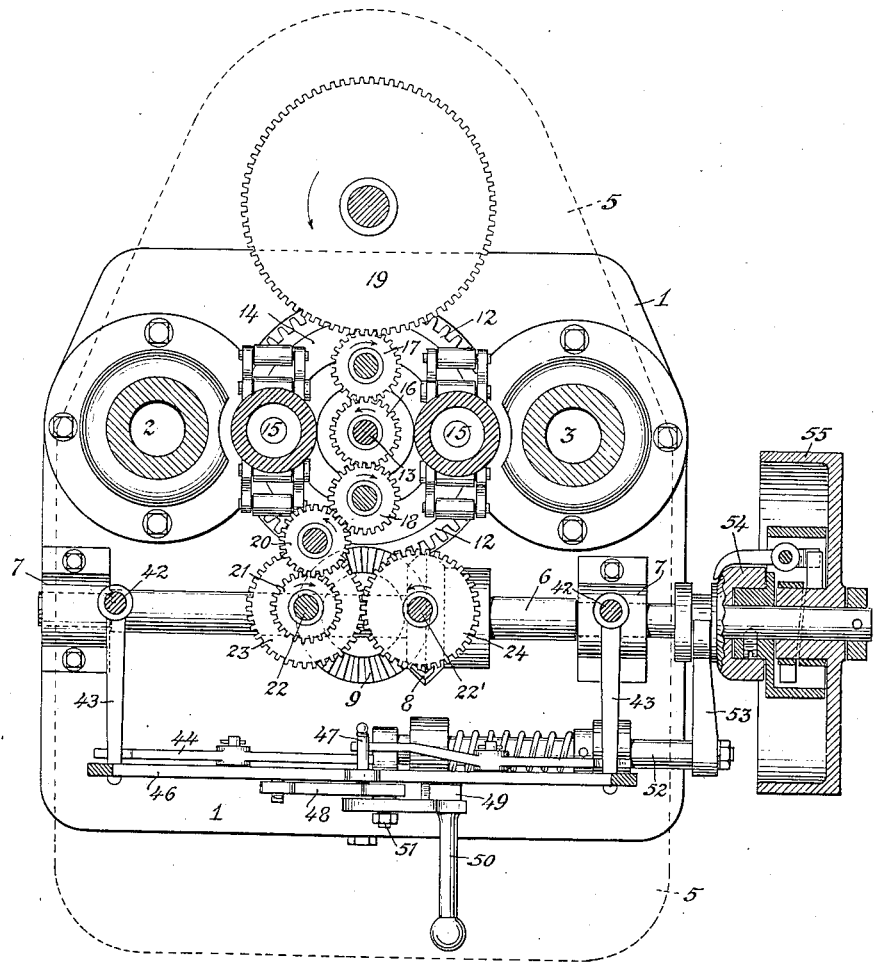
Figure 5:
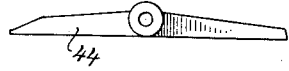
Figure 6:
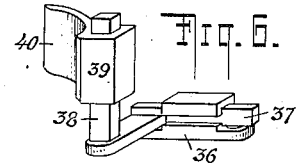

In the accompanying drawings, which are hereby made a part of the specification, Figure 1 is a front elevation of the assembled machine ready for operation; Fig. 2 is a side elevation of the same, taken from the left of Fig. 1; Fig. 3 is a combined plan and sectional view taken along line 3—3 of Fig. 1; Fig. 4 is a similar view taken along the line 4—4 of Fig. 1; Fig. 5 is a detail showing one of the intermediate clutch releasing levers; Fig. 6 is a similar detail showing in perspective one of the slidable bottle guides; Fig. 7 is a sectional elevation along line 7—7 of Fig. 3 through the sweeping finger and shift finger mechanism and Fig. 8 is a perspective view of one of the adapters for the shift finger.

In the drawings, base 1 supports two symmetrically-arranged identical pillars 2, 3 upon the top of which is supported an adjustable yoke mechanism 4 as described in my prior patent. A main operating platform or table 5, to which bottles are fed when about to be capped and from which they are removed when the capping operations are finished, is also supported upon the pillars 2, 3 at a suitable distance above the base.

As in my earlier machine, a main power shaft 6 is mounted in suitable bearings 7 supported from the base, and is provided at the one side of its center with a beveled spur gear 8 arranged to coöperate with a similar spur gear 9 adapted to revolve upon a spindle mounted between base 1 and shaft 6; immediately beneath gear 9 and integrally attached thereto is a flat spur gear (not shown) arranged to mesh with a similar gear 12 of much larger diameter positioned in a recess below the surface of said base. Gear 12 is fixed to a central shaft 13 supported between suitable bearings in the base 1 and platform 5 respectively. Fixed to the upper side of gear 12 is a face cam 14 and immediately above it (but not well shown as the drawings are made) is a similar complementary-faced cam. These two cams engage and operate the two plungers 15. This part of the mechanism is exactly as described in my prior patent, which may be referred to.

Fixed to the top of shaft 13 is a spur gear 16 which meshes with two idler gears 17 and 18, the former meshing again with a large diametered gear 19 at the rear of the machine, and the latter, through a second idler 20, with a gear 21 at the front, left center of the machine. Gear 21 is fixed to a short shaft 22 which carries a spur gear 23 meshing with an identical gear 24 (fixed on a similar shaft 22') symmetrically arranged on the other side of the machine. Gear 19 is fixed to a short shaft which passes up through the platform 5 and has attached to it, in a recess in the top of said platform a feed table 24' and above this a feed control cam 25 provided with peripheral equally-spaced and rounded projections 26.

Supported upon the table 5 adjacent to cam 25 is a feed control lever 27 pivoted at 28; one end of this lever is adapted to be contacted by the projections 26, while the other end is pivotally united to a rod 29. A sleeve 30, slidably mounted upon this rod, has its outer end pivoted at 31 to a combined stop and feed lever 32 itself pivoted to platform 5 at 33. The inner end of sleeve 30 is slotted and a pin 34 passes through this slot into the rod 29. A spring 35, inclosed by sleeve 30, extends between the end of rod 29 and pivotal point 31.

Fixed to the platform at the right and left respectively of the two plungers 15 are fixtures 36 (Fig. 6) each of which is provided with a transverse key-way in which is adapted to slide a bar 37 from an inner lateral extension of which is erected a post 38 provided with a vertically slidable bottle guide 39. This bottle guide is provided with a thin cylindrical segment 40 which normally rests upon the plunger just inside its periphery. Resting against the outer end of each bar 37 is one end of a clutch-control lever 41, the other end of said lever being fixed to a spindle 42 which passes down through the platform 5 and carries on its lower extremity a second lever 43. The outer end of each lever 43 is arranged just over a beveled portion of a latch release lever 44 (Fig. 5 and dotted in Figs. 1 and 3) pivotally attached at one side of the center to a bracket 46 (Figs. 1, 2 and 4 and dotted in Fig. 3) supported beneath the platform. The inner end of each lever 44 rests just below a pin 47 fixed to a latch 48 one end of which is pivoted to the bracket 46. The inner end of this latch 48, (which is normally pulled downwardly by a spring 48' having its lower end attached to the bracket 46) adjacent to pin 47, is notched to engage a block 49 at the top of a handled lever 50 pivoted to the base of the machine and attached at 51 to a clutch rod 52 the outer end of which carries a fork 53 by means of which a friction clutch 54 is made to clamp against the resistance of a spring 69 arranged in the usual way or release the main driving pulley 55 to or from the power shaft 6.

Mounted upon the platform 5 just between and in front of the plungers 15 is a box 56 provided with a hinged cover (shown open in dotted construction Fig. 2). Within this box and screwed to the table is a block 57 provided with two parallel central straight grooves or guideways 58; the two shafts 22, 22' lie respectively on the outside of each guideway. To these two shafts are fixed oppositely extended cranks 58', and at the outer end of each crank is pivotally attached an operating bar 59 the outer end of which is bent outwardly at an obtuse angle to constitute a sweeping finger 59ª for the removal of bottles from the plunger after they are capped. Just at the point where the operating bar joins this finger, is an upwardly and downwardly projecting hub or pin 59' the lower part of which rests loosely in the guideway 58.

One end of a sorting member 60 is pivotally mounted upon the block 57 midway between the two guideways and a little to the rear of the shafts 22, 22'. This sorting member has the form of a circular segment symmetrically hollowed out on each side and provided with a central radially projecting shift finger 61. The hollowed out portions of this member are so shaped that as the two spindles 22, 22' are revolved, thus causing the pins 59' to be reciprocated to and fro, the hollows will exactly engage the upper portion of the pins 59' of said connecting bars.

A pair of vertical strips 62, arranged substantially parallel to one another, extend from the rear of table 5 forwardly toward the left, and then curve around toward the right and terminate at the front edge of said feed table in the center of the machine. These strips form a guideway around the left hand side of feed table 24' for the bottles as they pass from the source of supply toward the capping plungers 15 as will be explained. Similarly strips 63 are arranged, parallel with and upon each side of box 56 and make up, with said box, a pair of guideways from each capping plunger for the bottles after they are capped. The strip 62 and both strips 63 are attached to the table by stud pins 64, which fit corresponding sockets (not shown) in the table, and may thus be readily removed when the machine is to be cleaned. The screws 65, (of a structural strip joining the ends of one of the strips 62) and stud pins 64 of strips 62 are sunk below the surface of the strips so that, when the machine is not in use, a suitable cover (not shown) having stud pins corresponding to said screws and strip stud pins may be used to cover the feed table and associated mechanism.

The operation of my improved machine is as follows: Each bottle is brought to the rear of feed table 24' by any convenient means and is successively carried, through the operation of said table, to and through the various positions $a$, $b$, etc., to $f$ where it is stopped by the stop and feed lever 32. An instant later this lever is withdrawn, (to dotted position Fig. 3) by reason of the rotation of cam 25 and consequent dropping, due to spring 68, of feed control lever 27 between the projections 26, and the bottle is again carried forward by the feed table. Feed control lever 27 is now again contacted by a projection 26 so as to bring lever 32 against the rear of the bottle and push it into position $g$. From this position it will be moved to and upon left hand plunger 15 (position h), where it will be capped by shift finger 61 upon member 60, this member being swung to the left by the combined action of the pins 59' upon the hollowed out portions of said member. From h the bottle will be removed to i by sweeping finger 59ª and thence to j and k as other bottles are successively capped and moved from the plunger by the sweeping finger. It will be noted that, as shaft 22 revolves (see arrow), the finger 59ª will as it approaches the rear end of its guideway 58, be given a position substantially parallel to said guideway so that the end of said finger will pass between bottles occupying positions g and h without distributing either until said finger begins to draw the bottle from the plunger. A bottle having been moved from position g to h by the shift finger the next succeeding bottle will similarly be moved to the right hand plunger 15 (position l) as the shift finger 15 is brought back to the right by the movement of pins 59' in their guideways. This alternate movement of successive bottles to the two plungers continues so long as the machine is operated.

Should a bottle be broken in passing from f to g, or should a bottle of abnormally large diameter be passing from one of these positions to the other the stop and feed lever 32 will yield and compress spring 35 so that no further breakage will occur. Also should an extra large diametered bottle be moved upon one of the plungers or should fragments of a broken bottle get upon or near one of said plungers and between the oncoming bottle and the segment 40, the bar 37, of the bottle guide to which this particular segment belongs, will be slid outwardly so as to actuate the clutch-control lever 41 thus causing lever 43, through latch release lever 44, to raise latch 48 and release lever 50 so as to throw out clutch 54 and stop the machine. The broken glass or obstructive bottle being removed, lever 50 may be grasped by its handle and thrown to the left and latched so as to again start the machine in action.

As the machine is shown it is arranged for substantially the largest sized bottle which it is capable of taking. If smaller bottles are to be capped on the same machine I substitute for the slidable bottle guides 39 similar guides having cylindrical segments 40 with their concave sides formed on a shorter radius and shifted toward the center of the plungers 15 (see dotted lines Fig. 3 e. g.). I also slip an adapter 66 of suitable size (Fig. 8) over the shift finger 61; this adapter may be of metal and rests on the shift finger between the peripheral arc of the sorting cam 60 and a lug 67 fixed to the upper outer end of said finger.

I do not wish to limit my invention to the exact embodiment shown herewith, which is merely a preferred form thereof, but claim:—

1. In a machine for feeding and capping bottles, in combination with capping mechanism, means for bringing a bottle to capping position, and means for removing the bottle after capping, said means comprising a guide, an operating bar one end of which has a sweeping finger fixed thereto and engages said guide, a crank to which the other end of said bar is pivotally attached, and means for actuating said crank.

2. In a machine for feeding and capping bottles, in combination with capping mechanism, means for bringing a bottle to capping position, and means for removing the bottle after capping, said means comprising a straight fixed guide, an operating bar one end of which has a sweeping finger fixed thereto and a member engaging said guide, a crank to which the other end of said bar is pivotally attached, and means for actuating said crank.

3. In a machine for feeding and capping bottles, in combination with capping mechanism, means for bringing a bottle to capping position, and means for removing the bottle after capping, said means comprising a straight fixed guide, an operating bar one end of which has a sweeping finger fixed thereto and a member engaging said guide, a crank pivoted at the side of said guide to which the other end of said bar is pivotally attached and means for actuating said crank.

4. In a machine for feeding and capping bottles provided with a pair of similar capping mechanisms, a sorting member symmetrically pivoted as to the capping mechanisms, means for bringing a bottle within reach of said sorting member, a pair of fixed guides symmetrically disposed as to the two capping mechanisms, an operating bar for each guide provided with a sweeping finger, a member engaging the guide and engaging the sorting member, and means for moving the operating bars in the guides so as to simultaneously move the sorting member and the sweeping fingers.

5. In a machine for feeding and capping bottles provided with a pair of similar capping mechanisms, a sorting member symmetrically pivoted as to the capping mechanisms, means for bringing a bottle within reach of said sorting member, a pair of fixed guides symmetrically disposed as to the two capping mechanisms, an operating bar for each guide having a sweeping finger at one end a member at the same end engaging the guide and further engaging the sorting member, cranks to which the other ends of said bars are pivotally attached, and means for simultaneously actuating said cranks.

6. In a machine for feeding and capping bottles provided with a pair of similar capping mechanisms, a sorting member symmetrically pivoted as to the capping mechanisms, means for bringing a bottle within reach of said sorting member, a pair of straight fixed guides symmetrically disposed as to the two capping mechanisms, operating bars for each guide one end of a bar being engaged with the guide and also with the sorting member, a crank for each operating bar having the other end of the bar pivotally attached thereto and means for simultaneously actuating said cranks.

7. In a machine for feeding and capping bottles provided with a pair of similar capping mechanisms, a sorting member symmetrically pivoted as to the capping mechanisms and symmetrically hollowed out on each side, a pair of straight guides symmetrically disposed as to the pivotal point of the sorting member, a sweeping finger for each guide having one end in engagement therewith and with a side of the sorting member and means for simultaneously giving the sweeping fingers movements of translation and rotation in the guides.

8. In a machine for feeding and capping bottles, in combination with capping mechanism, means for operating said machine, means for cutting off said operating means, and means adapted to be engaged and moved by abnormally large bottles for actuating said cutting off means said means comprising a removable bottle guide.

9. In a machine for feeding and capping bottles, in combination with capping mechanism, means for operating said machine, means for cutting off said operating means, and means adapted to be engaged and moved by abnormally large bottles for actuating said cutting off means, said means comprising a slidable element and a removable bottle guide mounted thereon.

10. In a machine for feeding and capping bottles, in combination with capping mechanism, means for operating said machine, means for cutting off said operating means, and means adapted to be engaged and moved by abnormally large bottles for actuating said cutting off means, said means comprising a fixture, a bar arranged to slide horizontally in said fixture and a vertically slidable removable bottle guide mounted upon said bar.

11. In a bottle feeding and capping machine in combination, a table, a fixture attached to said table, a bar arranged to slide in said fixture and provided with an extension, and a bottle guide adapted to slide upon said extension.

In testimony whereof, I have hereunto set my hand in the presence of two subscribing witnesses.

HENRY GODFRIED KLETT.

Witnesses:
ELMER G. WILLYOUNG,
JOHN A. KEHLENBECK.